United States Patent
Haddad, Sr.

[11] Patent Number: 6,145,611
[45] Date of Patent: Nov. 14, 2000

[54] COMPUTERIZABLE ROBOTIC AUTOMATED BOGIE

[76] Inventor: Albert G. Haddad, Sr., 1554 North Valley Pkwy., Lewisville, Tex. 75067

[21] Appl. No.: 08/988,830

[22] Filed: Dec. 11, 1997

[51] Int. Cl.[7] .............................. B62M 7/14; B60K 1/00; B62D 5/06
[52] U.S. Cl. .................. 180/12; 180/11; 180/15; 180/65.5; 180/65.6; 180/65.7; 180/411; 180/402; 180/8.6
[58] Field of Search .......................... 700/245; 180/11, 180/12, 15, 65.5, 65.6, 65.7, 411, 402, 8.6

[56] References Cited

U.S. PATENT DOCUMENTS

| | | | |
|---|---|---|---|
| 3,534,825 | 10/1970 | Reffle | 180/252 |
| 3,640,573 | 2/1972 | Safar | 299/31 |
| 4,200,162 | 4/1980 | Tax | 180/23 |
| 4,395,186 | 7/1983 | Whyte | 180/280 |
| 4,475,618 | 10/1984 | Kennedy et al. | 180/237 |
| 4,805,710 | 2/1989 | Jarl et al. | 180/24.02 |
| 5,067,853 | 11/1991 | Radnis | 405/182 |
| 5,082,074 | 1/1992 | Fischer | 180/11 |
| 5,558,174 | 9/1996 | Avitan et al. | 180/60 |
| 5,640,791 | 6/1997 | Fong | 40/414 |
| 5,781,705 | 7/1998 | Endo | 700/262 |
| 5,992,254 | 11/1999 | Machado | 74/335 |

Primary Examiner—William Grant
Assistant Examiner—Iván Calcaño

[57] ABSTRACT

A computerizable robotic automated bogie is provided including a drive motor and a main drive shaft extending downwardly from the drive motor. A rotatable plate is rotatably coupled to a bottom of a platform and further rotatable with respect to the main drive shaft. A gear mechanism is operatively coupled to the drive shaft. At least one wheel has an axis coupled with the gear mechanism thereby effecting rotation of the at least one wheel about a horizontal axis upon the actuation of the drive motor. The axis about which the at least one wheel rotates is fixed with respect to the rotatable plate. Further included is a rotating mechanism operatively engaged with the rotatable plate for selectively rotating the horizontal axis about which the at least one wheel resides.

15 Claims, 2 Drawing Sheets

COMPUTERIZABLE ROBOTIC AUTOMATED BOGIE

BACKGROUND OF THE INVENTION

1. Field of the Invention

The present invention relates to vehicles and more particularly pertains to a new computerizable robotic automated bogie for effecting versatile movement of various wheeled or tractor treaded units including, but not limited to wheelchairs, robots, forklifts and the like.

2. Description of the Prior Art

The use of vehicles is known in the prior art. More specifically, vehicles heretofore devised and utilized are known to consist basically of familiar, expected and obvious structural configurations, notwithstanding the myriad of designs encompassed by the crowded prior art which have been developed for the fulfillment of countless objectives and requirements.

Known prior art vehicles include U.S. Pat. No. 4,573,548 to Holland; U.S. Pat. No. 4,638,445 to Mattaboni; U.S. Pat. No. 5,446,356 to Kim; U.S. Pat. No. 5,073,749 to Kanayama; U.S. Pat. No. 4,736,826 to White et al.; and U.S. Pat. No. Des. 277,856 to Lewellen.

In these respects, the computerizable robotic automated bogie according to the present invention substantially departs from the conventional concepts and designs of the prior art, and in so doing provides an apparatus primarily developed for the purpose of effecting versatile movement of various wheeled units including, but not limited to wheelchairs, robots, forklifts and the like.

SUMMARY OF THE INVENTION

In view of the foregoing disadvantages inherent in the known types of vehicles now present in the prior art, the present invention provides a new computerizable robotic automated bogie construction wherein the same can be utilized for effecting versatile movement of various wheeled units including, but not limited to wheelchairs, robots, forklifts and the like.

The general purpose of the present invention, which will be described subsequently in greater detail, is to provide a new computerizable robotic automated bogie apparatus and method which has many of the advantages of the vehicles mentioned heretofore and many novel features that result in a new computerizable robotic automated bogie which is not anticipated, rendered obvious, suggested, or even implied by any of the prior art vehicles, either alone or in any combination thereof.

To attain this, the present invention generally comprises a drive motor mounted to a top of a platform associated with an upper structure. As shown in FIG. 1, a base plate is mounted to a bottom of the platform below the motor. Next provided is a main drive shaft extending downwardly from the drive motor through the platform and base plate. A rotatable gear plate is rotatably coupled to a bottom of the base plate with a bearing assembly situated therebetween. The rotatable gear plate has a plurality of angled gear teeth formed in a periphery thereof. Associated therewith is a pair of oil pan halves fixed to the base plate to encompass the rotatable gear plate and drive shaft. The aforementioned halves further define a closed upper oil pan. Fixed to a central extent of a bottom of the rotatable gear plate is a pair of weight-bearing yoke halves. Such yoke halves are further rotatable with respect to the pair of oil pan halves. As shown in FIG. 1, the yoke halves encompass the drive shaft and further define a lower oil pan. A differential assembly is operatively coupled to the drive shaft within the lower oil pan. A pair of wheels each have axles extending through a lower portion of the weight-bearing yoke halves for coupling with the differential assembly. By such interconnection, the rotation of the wheels is effected about a horizontal axis upon the actuation of the drive motor. Finally, an azimuth motor is mounted within the upper oil pan and operatively coupled to the teeth of the rotatable gear plate. The azimuth motor is thus adapted for selectively rotating the horizontal axis about which the wheels reside.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new computerizable robotic automated bogie apparatus and method which has many of the advantages of the vehicles mentioned heretofore and many novel features that result in a new computerizable robotic automated bogie which is not anticipated, rendered obvious, suggested, or even implied by any of the prior art vehicles, either alone or in any combination thereof.

It is another object of the present invention to provide a new computerizable robotic automated bogie which may be easily and efficiently manufactured and marketed.

It is a further object of the present invention to provide a new computerizable robotic automated bogie which is of a durable and reliable construction.

An even further object of the present invention is to provide a new computerizable robotic automated bogie which is susceptible of a low cost of manufacture with regard to both materials and labor, and which accordingly is then susceptible of low prices of sale to the consuming public, thereby making such computerizable robotic automated bogie economically available to the buying public.

Still yet another object of the present invention is to provide a new computerizable robotic automated bogie which provides in the apparatuses and methods of the prior art some of the advantages thereof, while simultaneously overcoming some of the disadvantages normally associated therewith.

Still another object of the present invention is to provide a new computerizable robotic automated bogie for effecting versatile movement of various wheeled units including, but not limited to wheelchairs, robots, forklifts and the like.

Yet another object of the present invention is to provide a new computerizable robotic automated bogie which includes a drive motor and a main drive shaft extending downwardly from the drive motor. A rotatable plate is rotatably coupled to a bottom of a platform and further rotatable with respect to the main drive shaft. A gear mechanism is operatively coupled to the drive shaft. At least one wheel has an axis coupled with the gear mechanism thereby effecting rotation of the at least one wheel about a horizontal axis upon the actuation of the drive motor. The axis about which the at least one wheel rotates is fixed with respect to the rotatable plate. Further included is a rotating mechanism operatively engaged with the rotatable plate for selectively rotating the horizontal axis about which the at least one wheel resides.

Still yet another object of the present invention is to provide a new computerizable robotic automated bogie that provides a means of streamlining the development and associated costs of designing and producing mobile robots and other automation products which require active motion capabilities in three degrees of freedom.

Even still another object of the present invention is to provide a new computerizable robotic automated bogie that provides the standardized and modular approach to the use of a mobility platform for autonomous robot and related product applications.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
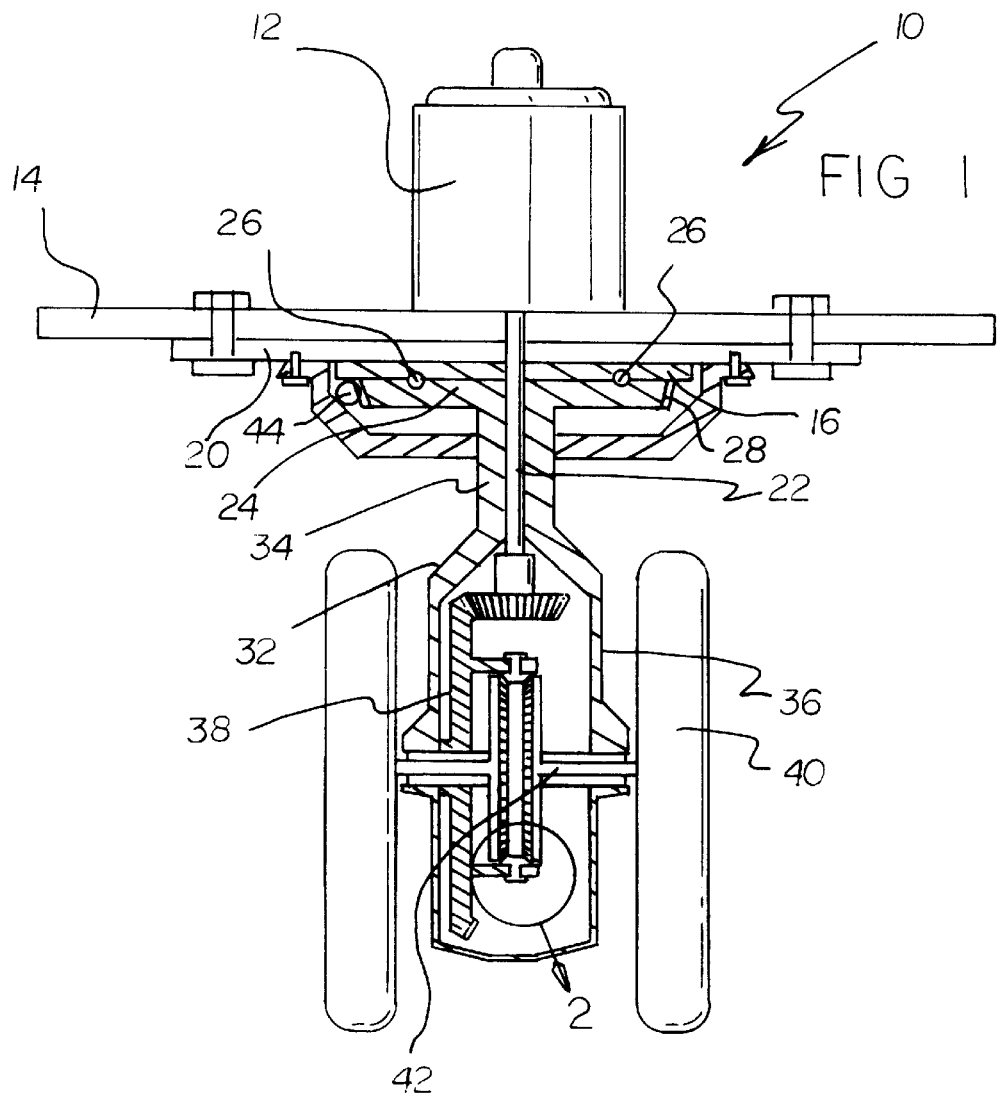
FIG. 1 is a front view of a new computerizable robotic automated bogie according to the present invention.
Figure 2:
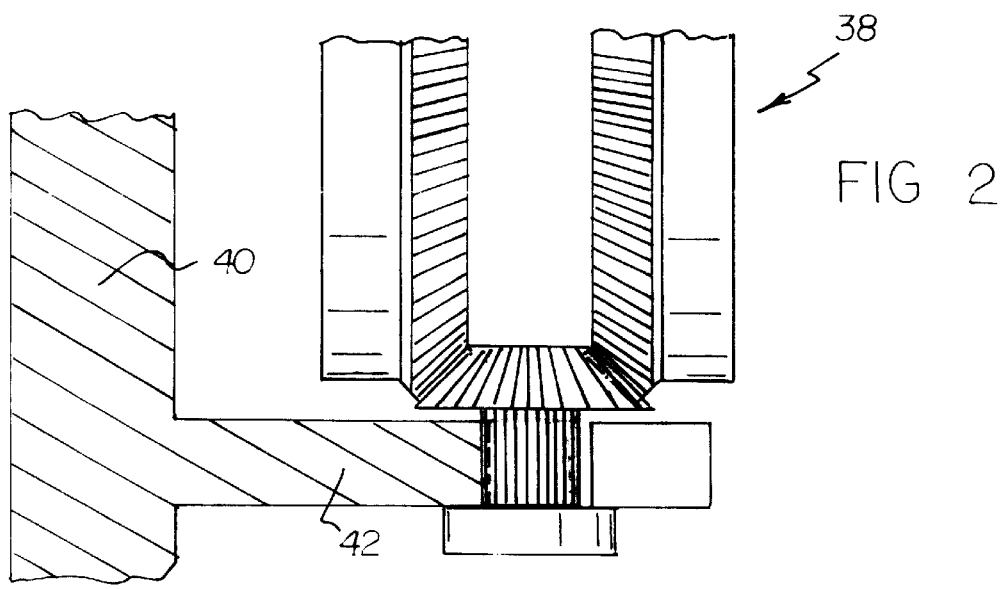
FIG. 2 is a sectional view of the present invention as taken from circle 2 of FIG. 1.
Figure 3:
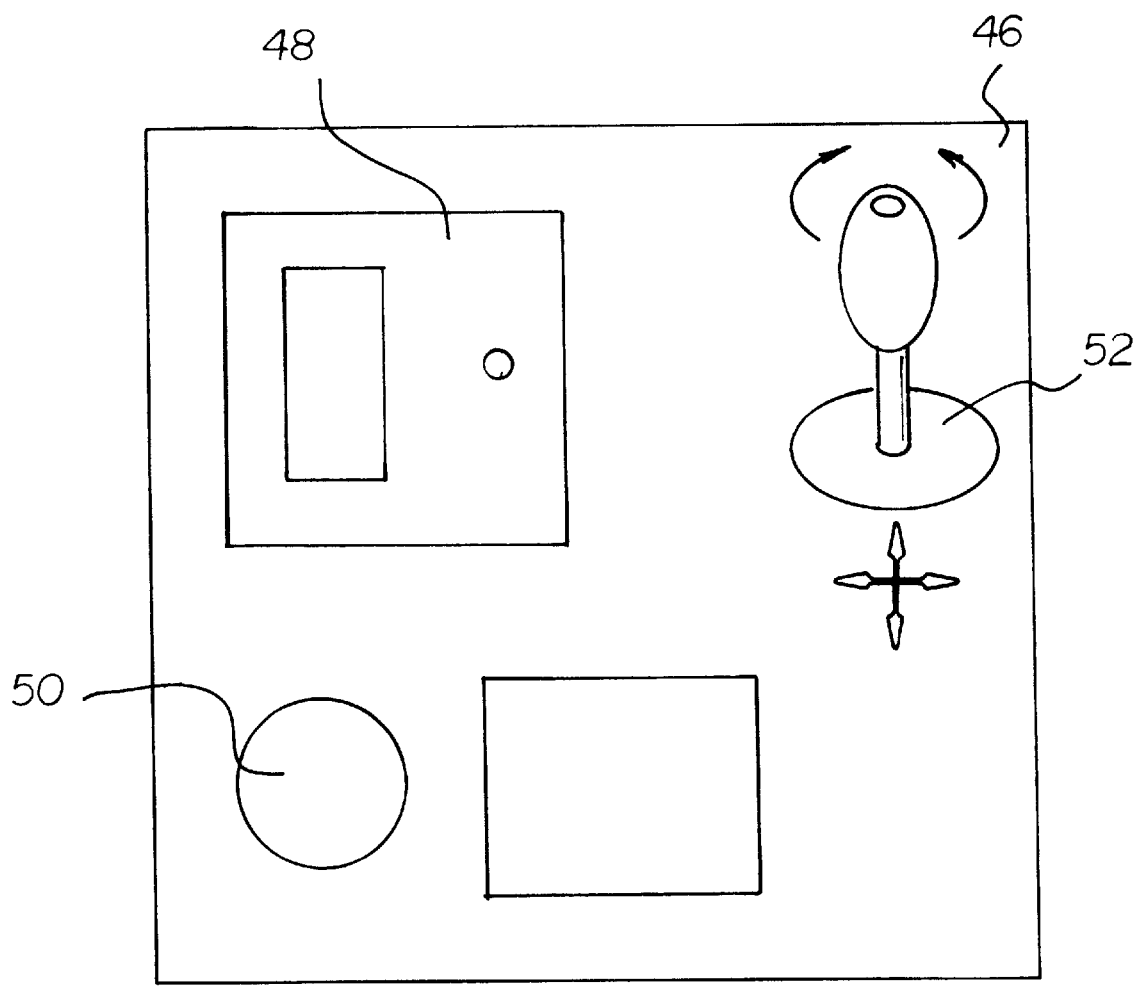
FIG. 3 is a top view of the control panel of the present invention.

With reference now to the drawings, and in particular to FIGS. 1 through 3 thereof, a new computerizable robotic automated bogie embodying the principles and concepts of the present invention and generally designated by the reference numeral 10 will be described.

The present invention, as designated as numeral 10, includes a drive motor 12 mounted to a top of a platform 14 associated with an upper structure corresponding to the current application of the present invention. The platform may define a bottom of any type of wheeled mechanism. As shown in FIG. 1, a base plate 16 is mounted to a bottom of the platform below the motor. Preferably, the base plate is mounted to the platform by way of a plurality of bolts 18 with an anchor plate 20 situated therebetween. The base plate functions as a support mechanism for the remaining components of the present invention. Next provided is a main drive shaft 22 extending downwardly from the drive motor through the platform and base plate.

A rotatable gear plate 24 is rotatably coupled to a bottom of the base plate with a bearing assembly 26 situated therebetween. The rotatable gear plate has a plurality of angled gear teeth 28 formed in a lower periphery thereof. Associated therewith is a pair of oil pan halves 30 fixed to the base plate to encompass the rotatable gear plate and drive shaft. The aforementioned halves further define a closed upper oil pan.

Fixed to a central extent of a bottom of the rotatable gear plate is a pair of weight-bearing yoke halves 32. Such yoke halves are further rotatable with respect to the pair of oil pan halves. The yoke halves encompass the drive shaft and further define a lower oil pan. As shown in FIG. 1, the yoke halves, together, define a tubular upper extent 34 and a generally cylindrical lower extent 36 situated about a horizontal axis. It should be noted that the yoke halves may be separated along a horizontal or vertical plane.

A differential assembly 38 is operatively coupled to the drive shaft within the lower oil pan. A pair of wheels 40 each have axles 42 extending through the lower extent of the weight-bearing yoke halves for coupling with the differential assembly. By such interconnection, the rotation of the wheels is effected about a horizontal axis upon the actuation of the drive motor.

Finally, an azimuth motor 44 is mounted within the upper oil pan and operatively coupled to the teeth of the rotatable gear plate. The azimuth motor is thus adapted for selectively rotating the horizontal axis about which the wheels reside by rotating the rotatable gear plate.

To allow the user to control the drive motor and azimuth motors for desired motion, both of such motors are connected to control circuitry residing within a control panel preferably mounted adjacent a seat of the platform. Further connected to the motors are encoders for feedback purposes that will become apparent hereinafter. As shown in FIG. 3, the control panel 46 further includes a touch responsive display 48, emergency stop button 50, and joy stick 52 all of which are further connected to the control circuitry within the control panel.

In operation, the user may effect forward, rearward, right and left perfect linear movement by biasing the joystick in a desired direction. The joy stick is further adapted to be swiveled, or rotated about a vertical axis, which works in conjunction with the control circuitry to effect rotation of the platform about a vertical axis. The user may further deactuate both motors upon the depression of the emergency stop button.

Further during use, the display is adapted to depict the present orientation of the platform and the wheels thereof. When desired, a user may simply touch the screen adjacent to the depicted platform. In response, the display is adapted to depict indicia at the point depressed and further the control circuitry communicates with the azimuth motor to effect the rotation of the horizontal axis associated with each of the wheels. Such rotation is subsequently depicted on the display. As such, upon the forward or rearward movement of platform, as dictated by the joy stick, the platform will move in concentric relationship with the point designated by the user.

It should be noted that during any movement desired by the user, the control circuitry effects proper acceleration of the drive motor and rotation of the azimuth motor so that smooth operation is afforded. In various alternate embodiments, the control circuitry and encoders may be interconnected either by hard wire or by way of wireless communication devices.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A computerizable robotic automated bogie for mounting to a platform comprising:

a drive motor mounted to a top of the platform;

a base plate mounted to a bottom of the platform below the motor;

a main drive shaft extending downwardly from the drive motor through the platform and base plate;

a rotatable gear plate rotatably coupled to a bottom of the base plate with a bearing assembly situated therebetween, the rotatable gear plate having a plurality of gear teeth formed in a periphery thereof;

a pair of oil pan halves fixed to the base plate to encompass the rotatable gear plate and drive shaft and further define a closed upper oil pan;

a pair of weight-bearing yoke halves fixed to a central extent of a bottom of the rotatable gear plate and further rotatable with respect to the pair of oil pan halves, the yoke halves encompassing the drive shaft and further defining a lower oil pan;

a differential assembly operatively coupled to the drive shaft within the lower oil pan;

a pair of wheels each having axles extending through a lower portion of the weight-bearing yoke halves for coupling with the differential assembly thereby effecting rotation of the wheels about a horizontal axis upon the actuation of the drive motor; and an azimuth motor mounted within the upper oil pan and operatively coupled to the angled teeth of the rotatable gear plate for selectively rotating the horizontal axis about which the wheels reside.

2. A computerizable robotic automated bogie comprising:

support means;

a drive motor mounted on the support means;

a main drive shaft extending downwardly from the drive motor;

a rotatable plate rotatably coupled to a bottom of the support means and further rotatable with respect to the main drive shaft;

a gear means operatively coupled to the drive shaft;

at least one wheel having an axis coupled with the gear means thereby effecting rotation of the at least one wheel about a horizontal axis upon the actuation of the drive motor, wherein the axis about which the at least one wheel rotates is fixed with respect to the rotatable plate; and rotating means operatively engaged with the rotatable plate for selectively rotating the horizontal axis about which the at least one wheel resides;

wherein the rotating means includes a pair of gears;

wherein a pan encompasses the rotatable plate and rotating means; and wherein the rotating means includes an azimuth motor fixed with respect to the pan.

3. A computerizable robotic automated bogie as set forth in claim 2 wherein a pan encompasses the gear means.

4. A computerizable robotic automated bogie as set forth in claim 2 wherein the support means includes a base plate for mounting to a platform of an object to transported by the bogie.

5. A computerizable robotic automated bogie as set forth in claim 4 wherein the support means includes a pan fixed with respect to the base plate and encompassing a rotatable gear plate and drive shaft.

6. A computerizable robotic automated bogie as set forth in claim 5 wherein the support means includes an anchor plate for mounting between the base plate and the platform.

7. A computerizable robotic automated bogie as set forth in claim 2 additionally comprising an azimuth motor for selectively rotating the horizontal directional axis about which the wheels rotate.

8. A computerizable robotic automated bogie as set forth in claim 2 additionally comprising a rotatable gear plate with a bottom surface, and a yoke fixed to a central extent of the bottom of the rotatable gear plate, the yoke being rotatable with respect to an upper pan.

9. A computerizable robotic automated bogie as set forth in claim 8 wherein the yoke encompasses the drive shaft and defines a lower pan.

10. A computerizable robotic automated bogie as set forth in claim 2 additionally comprising a differential assembly operatively coupled to the drive shaft and the at least one wheel.

11. A computerizable robotic automated bogie comprising:

support means;

a drive motor mounted on the support means;

a main drive shaft extending downwardly from the drive motor;

a rotatable plate rotatably coupled to a bottom of support means and further rotatable with respect to the main drive shaft;

a gear means operatively coupled to the drive shaft;

at least one wheel having an axis coupled with the gear means thereby effecting rotation of the at least one wheel about a horizontal axis upon the actuation of the drive motor, wherein the axis about which the at least one wheel rotates is fixed with respect to the rotatable plate; and rotating means operatively engaged with the rotatable plate for selectively rotating the horizontal axis about which the at least one wheel resides;

wherein an oil pan encompasses the rotatable plate and rotating means; and wherein the rotating means includes an azimuth motor fixed with respect to the oil pan.

12. A computerizable robotic automated bogie as set forth in claim 11 wherein an oil pan encompasses the gear means.

13. A computerizable robotic automated bogie as set forth in claim 11 wherein the rotating means includes a pair of gears.

14. A computerizable robotic automated bogie as set forth in claim 2 comprising a pair of wheels rotatable about a common axis.

15. A computerizable robotic automated bogie as set forth in claim 14 wherein the wheels are operatively coupled together by a differential assembly.

* * * * *